United States Patent Office 2,873,811
Patented Feb. 17, 1959

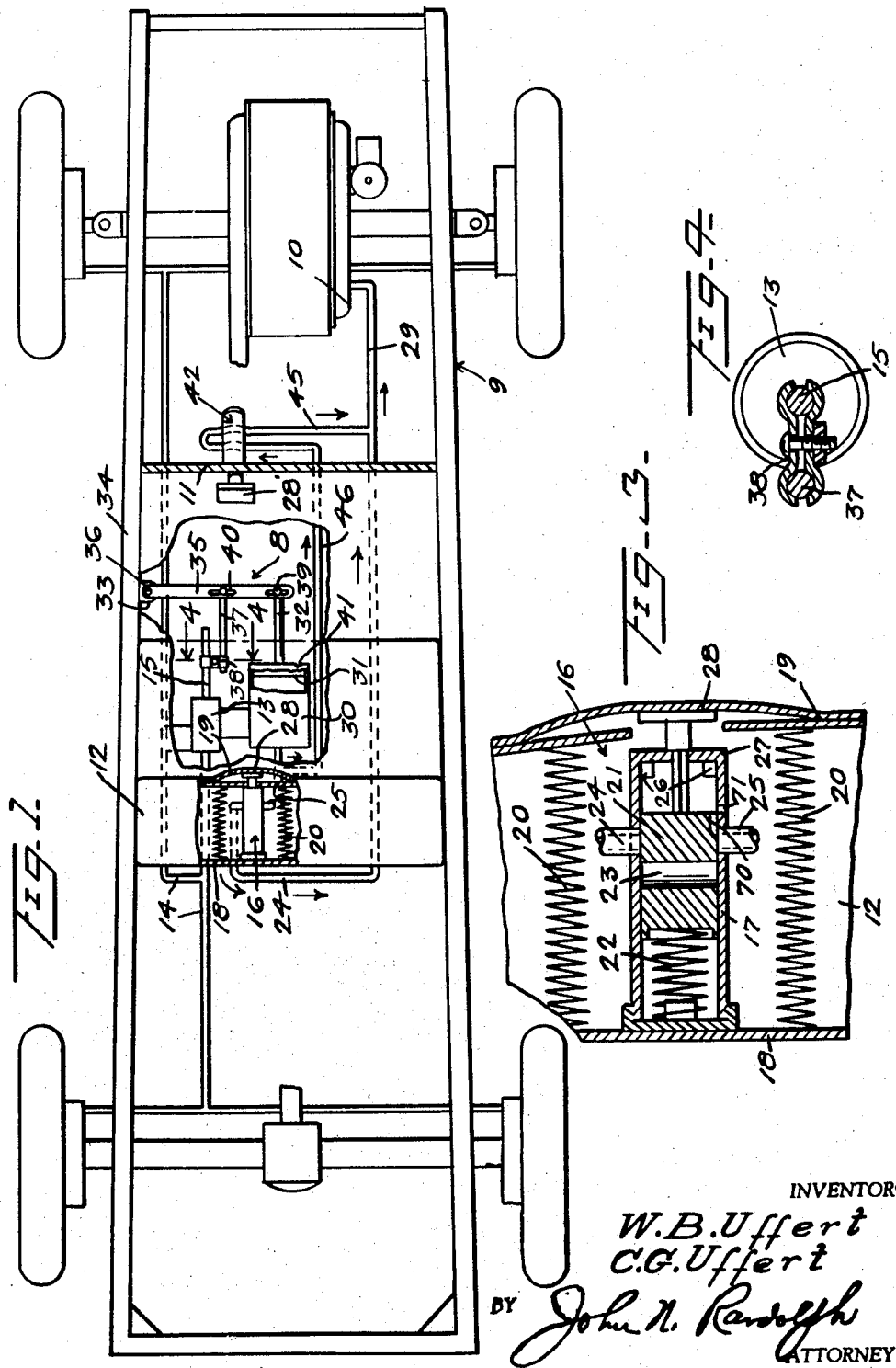

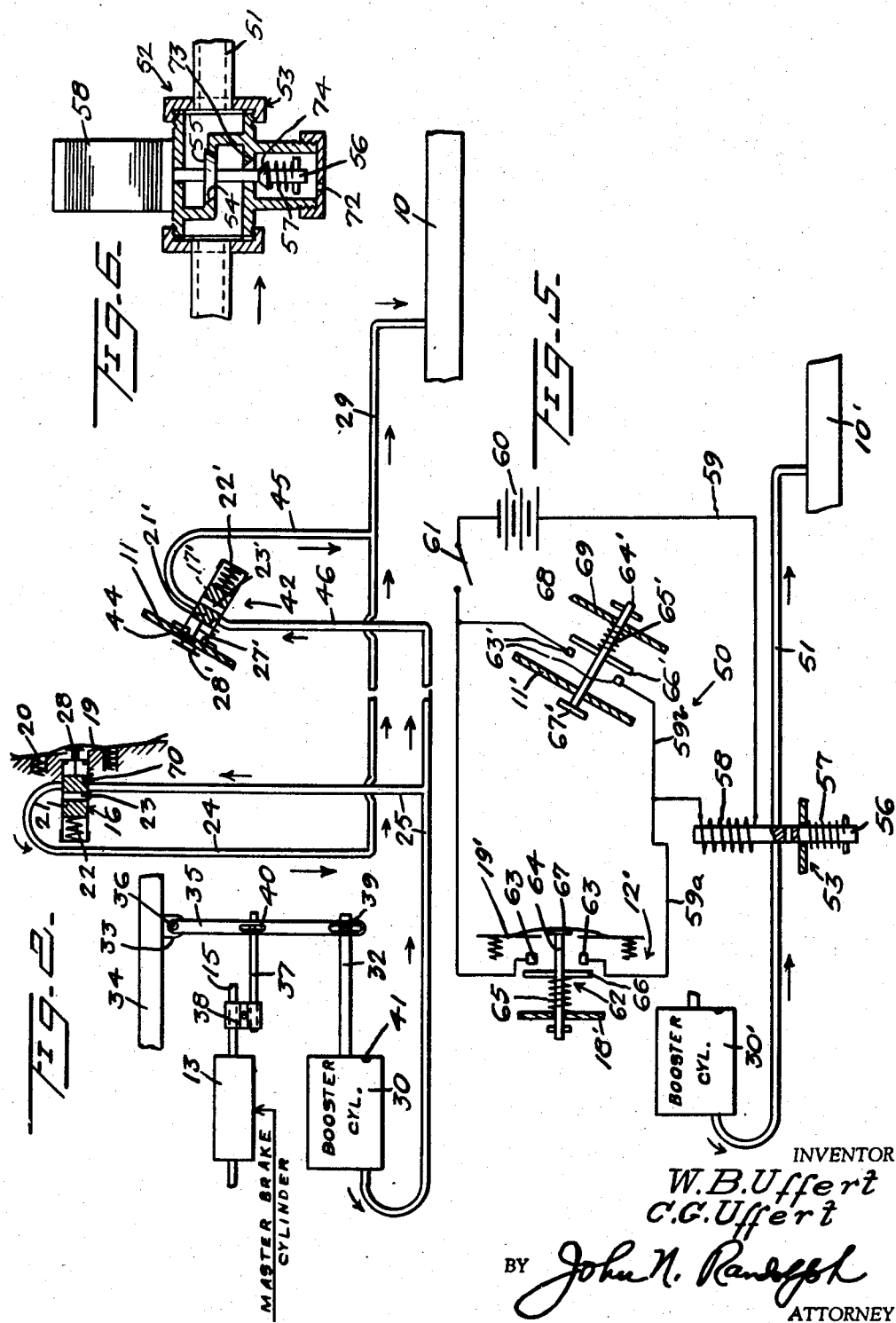

2,873,811

AUTOMATIC BRAKE ACTUATOR FOR A MOTOR VEHICLE

Walter B. Uffert and Coral G. Uffert, Catskill, N. Y.

Application January 11, 1957, Serial No. 633,721

1 Claim. (Cl. 180—82)

This invention relates to a safety device for motor vehicles and more particularly to a safety device adapted to be actuated by suction in the engine of the vehicle for applying the vehicle brakes, and which suction system is controlled by means positioned to be engaged by a part of the body of the vehicle operator for rendering the brake applying means inoperative when the vehicle operator is assuming a normal position for operating the vehicle and which will automatically be rendered operative upon movement of the vehicle operator to an abnormal position.

More particularly, it is an aim of the present invention to provide a safety attachment for motor vehicles which will automatically apply the brakes to stop the vehicle should the operator suddenly become incapacitated and thereby rendered incapable of maintaining control of the vehicle.

Still a further aim of the present invention is to provide control means for the safety attachment so disposed that no conscious effort on the part of a vehicle operator is required to maintain the safety attachment inoperative and which will immediately be rendered operative in the event that the operator assumes an abnormal driving position as would occur if the operator suddenly became incapacitated.

Various other objects and advantages of the invention will hereinafter become more fully apparent from the following description of the drawings, illustrating presently preferred embodiments thereof, and wherein:

Figure 1 is a fragmentary plan view of the chassis and a portion of the body of a motor vehicle and illustrating a preferred form of the safety attachment;

Figure 2 is a view primarily diagrammatic and partly in section of the safety attachment as disclosed in Figure 1;

Figure 3 is an enlarged fragmentary sectional view through a part of the safety attachment of Figures 1 and 2;

Figure 4 is an enlarged fragmentary cross sectional view, taken substantially along a plane as indicated by the line 4—4 of Figure 1;

Figure 5 is a view, primarily diagrammatic, illustrating another form of the safety attachment, and Figure 6 is an enlarged sectional view, partly in elevation, of a part of the safety attachment as shown in Figure 5.

Referring more specifically to the drawings, and first with reference to Figures 1 to 4, the safety attachment or automatic brake actuator as disclosed in these views and comprising a preferred embodiment of the invention is designated generally 8. The safety attachment 8 is illustrated in Figures 1 and 2 in conjunction with conventional parts of a motor vehicle 9 including an intake manifold 10 of the vehicle engine, a portion of the floor board 11, a back rest 12 of the front seat, the master cylinder 13 of a hydraulic brake system 14, and the piston rod 15 which extends forwardly from the master cylinder 13 and which is connected to and actuated by a brake pedal in a conventional manner, not shown.

The automatic brake control or safety attachment 8 includes a valve designated generally 16 and which includes an elongated cylindrical valve housing 17, the rear end of which is immovably secured to the rigid rear wall 18 of the back rest 12, as seen in Figure 3. The valve housing 17 extends forwardly from said rear wall 18 and is at its forward end spaced inwardly or rearwardly with respect to a flexible material 19 constituting a front wall of the back rest 12 and which is normally held in a forwardly extended position by back rest springs 20, between certain of which the valve 16 is disposed. A valve body or core 21 is slidably mounted in the housing 17 and is urged forwardly thereof by a compression spring 22 which is contained in said housing 17 between its rear end and the rear end of the core 21. The core 21 is provided with a transverse bore 23 which aligns with aligned adjacent ends of conduits 24 and 25, when the core 21 is urged to a forwardmost position against the stops 26 by the spring 22. The adjacent ends of the conduits 24 and 25 communicate with the interior of the housing 17 at diametrically opposed points and are sealed off from one another when the core 21 is displaced rearwardly, as seen in Figure 3. A valve stem 27 is fixed to and extends forwardly from the forward end of the core 21 and slidably through the front wall of the housing 17. The valve stem 27 may be of noncircular shape in cross section to nonturnably engage the housing front wall to prevent turning of the core 21 in the housing 17. A head 28 is detachably secured to the forward end of the stem 27, beyond the forward end of the housing 17 and bears against the front covering 19 of the back rest 12.

A conduit 29 has a forward end connected to and communicating with the intake manifold 10. The conduit 29 extends rearwardly from the intake manifold 10 and is provided at its opposite end with a flexible extension constituting the conduit 24. The conduit 25 is also flexible and has an opposite end which connects and communicates with the rear end of a booster cylinder 30 which is suitably mounted beneath a portion of the vehicle body, preferably in laterally spaced relation to the master cylinder 13. A piston 31 is slidably disposed in the booster cylinder 30 and has a piston rod 32 extending slidably through the front well of the booster cylinder.

A bracket 33 is fixed to and extends inwardly from the left sill 34 of the chassis of the motor vehicle 9 and one end of a lever arm 35 is pivotally connected as seen at 36 to the bracket 33 for forward and rearward swinging movement. The lever arm 35 extends inwardly from the bracket 33 and is disposed forwardly of the brake master cylinder 13 and booster cylinder 30.

A rod 37 is connected by a clamp 38 to the piston rod 15 of the master cylinder and is laterally offset from and disposed substantially parallel to said rod 15. The forward end of the piston rod 32 is slidably connected as seen at 39 to the lever arm 35, adjacent the free end of said lever arm, and the forward end of the rod 37 is slidably connected as seen at 40 to the intermediate portion of the lever arm 35. The forward end of the booster cylinder 30 is provided with a vent port 41 to permit the piston 31 to slide freely in the cylinder 30 so that the automatic brake actuator 8 will not impede normal operation of the vehicle brake system 13, 14 by resisting to any appreciable extent movement of the piston rod 15.

The valve 16 is so disposed that the vehicle operator when seated in a normal position will have a part of his back pressing against a portion of the covering 19 which is disposed over the head 28 so that the valve will be held closed as seen in Figure 3 to maintain the automatic brake actuator inoperative. In the event that the operator should become incapacitated his normal tendency would be to slump forward. When this occurs, the spring 22 will displace the core 21 forwardly to position the bore 23 in alignment with the conduits 24 and 25 so that the suction from the intake manifold 10 will create a partial vacuum in the booster cylinder 30 behind the piston 31 to displace said piston rearwardly or from right to left of Figure 1. The lever 35 will thus be caused to swing rearwardly or to the left as seen in Figure 1 and thus exert a rearward thrust on the rod 37 and the rod 15 for applying the vehicle brakes, to thus automatically stop the vehicle. It will also be apparent that the vehicle operator could lean forward to apply the brakes in the aforedescribed manner for holding the vehicle, as while stopped on an incline and could release the brakes when desired by leaning backward against the back rest 12. A passage 70 in the valve body 21 connects the conduit 25 to a vent port 71 of the housing 17, when the valve 16 is closed, for venting the rear end of the booster cylinder 30 to the atmosphere.

A second valve 42, which corresponds structurally to the valve 16 is shown mounted on the under or forward side of the inclined front portion 11 of the floor board. The forward end of the housing 17' of the valve 42 is secured against the under or forward side of the floor board 11. The valve stem 27' extends from the forward end of the housing 7' through an opening 44 of the floor board 11 and the head 28' is disposed on the upper or rear side of the floor board 11. Adjacent ends of the two conduits 45 and 46 are connected to diametrically opposite portions of the housing 17' so that when the core 21' is moved by the spring 22' toward the floor board 11, the bore 23' will move into registration with the conduits 45 and 46. The conduit 45 forms a branch of the conduit 29 and the conduit 46 constitutes a branch of the conduit 25.

The valve 42 is normally utilized in motor vehicles having automatic transmissions and no clutch pedal, and is located so that the head 28' will be engaged by the left foot of the vehicle operator when disposed in a normal position. Thus, should the vehicle operator lose consciousness or otherwise become incapacitated, the pressure exerted with the left foot on the head 28' would diminish sufficiently so that the spring 22' would move the valve 42 to an open position to allow a partial vacuum to be created in the booster cylinder for actuating the brakes automatically in the manner as previously described. The valve 42 may be utilized together with valve 16 or the valve 16 may be omitted where the valve 42 is provided. The valve 42 may be very conveniently operated by the vehicle driver for holding the vehicle while stopped on an incline by merely releasing pressure on the head 28'. The valve 42 has a passage 70' and a port 71' corresponding to and functioning for the same purpose as the passage 70 and port 71, respectively.

Figures 5 and 6 illustrate a slightly different embodiment of the automatic brake actuator, designated generally 50 and which includes a conduit 51 leading from the rear end of the booster cylinder 30' to the intake manifold 10'. A valve, designated generally 52, includes a valve housing 53 which is interposed in the conduit 51 and which is provided with a valve seat 54. A valve body 55 is fixed to a valve stem 56 which is urged downwardly by a valve spring 57 to normally retain the valve body 55 in a closed position and in engagement with the valve seat 54. The upper portion of the valve stem 56 forms the core of a solenoid 58 which is mounted on the housing 53 and which is interposed in an electric circuit 59 of a current source 60, such as a storage battery. A vehicle ignition switch 61 also forms a part of the circuit 59 so that the solenoid 58 may be energized only when the ignition switch 61 is closed.

A normally closed electric switch 62 is mounted in the front seat back rest 12' and includes two fixed contacts 63 which define a gap in a branch portion 59a of the circuit 59. The switch 62 includes a plunger 64 which is urged forwardly by a spring 65 to move a conductor bridge 66, which is fixed to the plunger 64, into engagement with the contacts 63 for bridging the gap therebetween. The head 67 of the plunger 64 bears against the inner side of a flexible front wall 19' of the back rest 12' and is positioned to be displaced rearwardly by the pressure of the vehicle driver leaning against the back rest to move the conductor bridge 66 to a circuit interrupting position out of engagement with the contacts 63, as seen in Figure 5. One end of the spring bears against the conductor bridge 66, and the other end thereof bears against the rigid rear wall 18' of the back rest.

A second switch 68, corresponding to the switch 62 is mounted beneath the floor board portion 11'. The spaced contacts 63' thereof form a gap in a second branch portion 59b of the electric circuit. The spring 65' bears against a rigid element 69 which is disposed beneath the floor board portion 11', and the plunger 64' extends slidably through said element 69 and the floor board 11' and has its head 67' disposed above the floor board portion 11', and in the same position as the head 28'. The conductor bridge 66' of the switch 68 is urged toward the floor board 11' and into engagement with the contact 63' by the spring 65', for bridging the gap therebetween. Pressure of the left foot against the head 67' normally retains the switch 68 in an open position as illustrated in Figure 5.

With the ignition switch 61 closed, the release of pressure against either the head 67 or 67', in the same manner as previously described in reference to the release of pressure against the heads 28 or 28', will result in the closing of the electric circuit 59 and energize the solenoid 58 for moving the valve stem 56 upwardly against the spring 57 to unseat the valve body 55 so that suction through the conduit 51 from the intake manifold 10' will produce a partial vacuum in the booster cylinder 30' to automatically apply the vehicle brakes in the same manner as previously described in reference to the automatic brake control 8. The housing 53 has a vent port 72 and a second valve seat 73. A second valve body 74 is carried by the stem 56 to close the valve seat 73 when the valve body 55 moves to an open position. The valve body 74 assumes an open position, when the valve body 55 moves to a closed position, so that the rear end of the booster cylinder 30' is then vented to the atmosphere, for the same purpose as previously described. It will also be apparent that either the switch 62 or the switch 68 could be omitted with omission of the branch circuit portion 59a or 59b, respectively.

Various other modifications and changes are contemplated and may be resorted to, without departing from the function or scope of the invention as hereinafter defined by the appended claim.

We claim as our invention:

An automatic brake actuator for a motor vehicle comprising, in combination with a piston rod of the master brake cylinder of a hydraulic vehicle brake system, a rod, means connecting said rod to the piston rod for movement of the rod and piston rod in unison, a lever arm, means adapted to be supported by a part of the vehicle chassis and swingably mounting said lever arm for forward and rearward swinging movement away from and toward, respectively, the master brake cylinder, means connecting a forward portion of said rod to said lever arm at a point intermediate of the ends of the lever arm, a fixedly disposed booster cylinder mounted in transversely spaced relation to the brake master cylinder, a piston slidably disposed in the booster cylinder, a piston rod connected to the piston and extending slidably through the forward end of said booster cylinder, means connecting the forward end of said last mentioned piston rod to said lever arm, a conduit communicating with and leading from the rear end of said booster cylinder, said conduit having an end adapted to be connected to and communicating with the intake manifold of the vehicle engine, valve means interposed in said conduit for opening and closing the connection between the booster cylinder and the intake manifold, spring means normally holding the valve means in an open position, a valve actuator adapted to be disposed in the vehicle front seat back rest and positioned to be engaged by the back of the vehicle operator for retaining said valve means in a closed position against the action of the spring means when a pressure is exerted against said valve actuator, a second valve actuator adapted to extend slidably through a portion of the vehicle floor board and having an end adapted to be engaged by the left foot of the vehicle operator for retaining the valve means in a position for shutting off the connection between the booster cylinder and intake manifold, said valve means comprising separate valves, said conduit having separate branch portions in which said valves are disposed, one of said valves being mounted in the vehicle back rest, said first mentioned valve actuator comprising a valve stem directly connected to the valve contained in the back rest, said other valve being mounted beneath the vehicle floor board, said second valve actuator comprising a valve stem directly connected to the other valve, said spring means comprising a spring associated with each valve.

References Cited in the file of this patent

UNITED STATES PATENTS

| | | |
|---|---|---|
| 1,997,783 | Wyllie | Apr. 16, 1935 |
| 2,172,116 | Warren | Sept. 5, 1939 |
| 2,287,199 | Schick | June 23, 1942 |
| 2,344,826 | Le Gresley | Mar. 21, 1944 |